(12) United States Patent
Sun et al.

(10) Patent No.: US 12,338,180 B2
(45) Date of Patent: Jun. 24, 2025

(54) PROCESS FOR PRODUCING MICROCRYSTALLINE ALPHA-ALUMINA BY MICROWAVE CALCINATION

(71) Applicant: HENAN CHANGXING INDUSTRY CO, LTD., Zhengzhou (CN)

(72) Inventors: Zhiang Sun, Zhengzhou (CN); Feifei Liang, Zhengzhou (CN); Xiaohui Jiang, Zhengzhou (CN); Bo Dong, Zhengzhou (CN); Qian Wang, Zhengzhou (CN); Dongmei Zhang, Zhengzhou (CN); Junjian Wang, Zhengzhou (CN); Yanan Xue, Zhengzhou (CN); Zhikai Xu, Zhengzhou (CN); Fang Wang, Zhengzhou (CN); Yanjun Yang, Zhengzhou (CN); Mingjing Li, Zhengzhou (CN); Meishan Shao, Zhengzhou (CN)

(73) Assignee: HENAN CHANGXING INDUSTRY CO, LTD., Zhengzhou (CN)

( * ) Notice: Subject to any disclaimer, the term of this patent is extended or adjusted under 35 U.S.C. 154(b) by 728 days.

(21) Appl. No.: 17/731,274

(22) Filed: Apr. 28, 2022

(65) Prior Publication Data

US 2022/0250987 A1    Aug. 11, 2022

(30) Foreign Application Priority Data

Apr. 29, 2021 (CN) .......................... 202110474923.0

(51) Int. Cl.
*C04B 35/10* (2006.01)
*C04B 35/626* (2006.01)

(52) U.S. Cl.
CPC .......... *C04B 35/10* (2013.01); *C04B 35/6261* (2013.01); *C04B 2235/3217* (2013.01); *C04B 2235/606* (2013.01)

(58) Field of Classification Search
None
See application file for complete search history.

(56) References Cited

U.S. PATENT DOCUMENTS

| | | | |
|---|---|---|---|
| 5,457,076 A * | 10/1995 | Katagiri | H01L 23/66 501/135 |
| 2003/0017945 A1 | 1/2003 | Kolenda et al. | |
| 2003/0082100 A1 | 5/2003 | Kolenda et al. | |
| 2006/0194691 A1* | 8/2006 | Wang | C01G 23/006 501/139 |
| 2007/0021292 A1* | 1/2007 | Maki | C01F 7/023 501/153 |
| 2010/0120607 A1* | 5/2010 | Kim | C04B 35/01 501/137 |
| 2017/0088759 A1 | 3/2017 | Wang | |
| 2019/0016638 A1* | 1/2019 | Itoh | C23C 14/3414 |
| 2023/0294997 A1* | 9/2023 | Ros Lis | C01B 33/12 423/325 |

* cited by examiner

*Primary Examiner* — John J Figueroa
(74) *Attorney, Agent, or Firm* — Jose Cherson Weissbrot

(57) ABSTRACT

The present disclosure discloses a process for producing microcrystalline alpha-alumina by microwave calcination, which relates to the production process of calcined alumina. The product of the present disclosure has stable quality. The yield of the process of the present disclosure is higher than that of the traditional kiln production method. The energy consumption during the preparation of alpha-alumina is greatly reduced, and the zero emission of harmful gases is realized.

10 Claims, 2 Drawing Sheets

PROCESS FOR PRODUCING MICROCRYSTALLINE ALPHA-ALUMINA BY MICROWAVE CALCINATION

TECHNICAL FIELD

The present disclosure relates to the production process of calcined alumina, and specifically relates to a process for producing microcrystalline alpha-alumina by microwave calcination.

BACKGROUND

Alpha-alumina known as calcined alumina, with high melting point and high hardness, is the most stable phase among all phases of alumina. It is widely used in many fields such as refractory materials, glass and chemical materials, and generally produced by the traditional kiln such as tunnel kilns and down-draft kilns. However, the traditional kiln requires a large amount of energy such as fuel oil, natural gas, and electric energy to calcine, and uses radiation or thermal conduction as the heating method that the heat utilization efficiency is only 10%-30%. Thus, the energy utilization rate is not high, and the combustion of fuels would produce a large amount of polluting gas which requires environmental protection treatment. Therefore, the traditional kiln used for the production of alpha-alumina has shortcomings such as long heating time, large energy consumption, and difficulty in controlling the pollution emission. And the cost of producing calcined alumina is greatly increased due to the pollution on powder caused by the saggar and the loss of the saggar.

SUMMARY

The present disclosure is to provide a process for producing microcrystalline alpha-alumina by microwave calcination to solve the problems in the prior art, such as large energy consumption, heavy pollution and high cost.

The technical solutions employed by the present disclosure are as follows:

The process for producing the microcrystalline alpha-alumina by the microwave calcination comprises the following steps:

(1) adding a composite mineralizer to an alumina raw material and mixing uniformly, to obtain a mixture;

(2) putting the mixture obtained in the step (1) into a ball mill for ball milling, to obtain a milled alumina powder;

(3) adding a certain proportion of a microwave absorbent into the milled alumina powder obtained in the step (2) and stirring evenly, and then extruding by a press, to obtain an alumina green body;

(4) drying the alumina green body obtained in the step (3), to adjust a moisture content of the alumina green body;

(5) feeding the alumina green body dried in the step (4) into a microwave kiln, then heating the microwave kiln to a set temperature, and calcining for a certain period of time, to obtain an alpha-alumina clinker; and (6) pulverizing the alpha-alumina clinker obtained in the step (5), to obtain the microcrystalline alpha-alumina.

Preferably, based on the weight of the alumina raw material, the composite mineralizer in the step (1) is composed of the following components: chloride 0%-3%, fluoride 0%-3%, and boric acid 0%-1%; and a minimum addition amount of the composite mineralizer is 0.01%.

Preferably, in the step (2), a ball-to-powder ratio of the ball mill is 1-6, a D50 particle size of the milled alumina powder is 5-30 μm, and a sieve residue ratio of the milled alumina powder sieved with a 200-mesh sieve is less than or equal to 5%.

Preferably, in the step (3), the microwave absorbent is composed of a microwave-absorbing component with a mass ratio of 0.01%-1%, and the balance of water; and the microwave-absorbing component is one or more of polyvinyl alcohol, carboxymethyl cellulose, and lignin.

Preferably, in the step (3), the microwave absorbent is composed of the microwave-absorbing component with the mass ratio of 1%-5%, and the balance of water; and the microwave-absorbing component is one or more of pseudo-boehmite, gamma-alumina, rho-alumina, and aluminum hydroxide.

Preferably, in the step (3), a mass ratio of the microwave absorbent and the milled alumina powder is 0-0.3, and a molding pressure of the alumina green body is 0.5 MPa-60 MPa.

Preferably, in the step (4), the drying temperature is 10° C.-100° C., and the moisture content of the alumina green body dried is 3%-20%.

Preferably, in the step (5), the set temperature is 1100° C.-1500° C., and the calcination time is 0.1-4 h.

Preferably, in the step (6), a particle size of the microcrystalline alpha-alumina obtained in the step (6) is 0.1-1.5 μm.

Preferably, the fluoride is any one or more of aluminum fluoride, calcium fluoride, magnesium fluoride, ammonium fluoride, and ammonium hydrogen fluoride; the chloride is any one or more of aluminum chloride, calcium chloride, magnesium chloride, and ammonium chloride.

In summary, the above-mentioned technical solutions employed by the present disclosure bring the following beneficial effects:

(1) The present disclosure prepares the milled alumina powder into the alumina green body so that no saggar is required to be used during calcination. Only the ceramic lining is required, and the operation is simple. What's more, the saggar has short service life and less reuses, while the ceramic lining can be used repeatedly to reduce the production cost, and the prepared bricks are not easy to adhere to the ceramic lining. Thus, using the ceramic lining has less loss during calcination and higher yield of the product. When the saggar is used, the milled alumina powder in contact with the inner wall of the saggar heats up quickly and melts, and adheres to the inner wall of the saggar after the calcination is completed, which affects the yield of the product.

(2) A high temperature can be reached by the microwave calcination in a short period of time without heat conduction, so the energy utilization rate is very high. Compared with the traditional kiln, the microwave calcination can significantly reduce the energy consumption for calcination. And using the electric energy to replace other fuels as the energy source of the kiln does not produce exhaust gas, so that the emission of sulfur oxides, nitrogen oxides and carbon dioxide is avoided. Thus, the microwave calcination is more environmentally friendly.

(3) In the microwave calcination process, the microcrystalline alpha-alumina is heated by molecular vibration, rather than by flame burning. Therefore, the inside and outside of the alumina green body are heated at the same time during calcination, the growth of the crystal is more uniform, and the phenomenon of "fast growth of the outer layer and slow growth of the core" does not occur. Through the microwave calcination process, the yield is increased, and the cost is greatly reduced. In addition, the produced microcrystalline alpha-alumina has higher purity, more uniform crystal, and narrower particle size range. The ultrafine powder with better quality is produced.

(4) in the process of microwave heating, alumina has poor coupling with the microwave at low temperature, and even does not absorb the microwave energy to be heated. However, when the critical value is reached, the dielectric loss of alumina is increased rapidly to absorb the microwave energy and convert into heat. By adding a certain proportion of the microwave absorbent, the present disclosure utilizes the microwave absorbing ability of the microwave-absorbing component in the microwave absorbent to rapidly heat alumina up during calcination, so that the calcination time is shortened.

(5) When the alumina powder is calcined with the saggar, there is a large gap between the alumina powder and the mineralizer, so that the specific surface area is large. Due to the volatilization or lower decomposition temperature of the mineralizer, the mineralizer and its decomposition product is easy to be lost quickly from the gap, and most of the mineralizer has been lost before the maximum temperature is reached, which affects the use effect of the mineralizer. The present disclosure prepares the milled alumina powder into the alumina green body, the gap between the mineralizer and alumina is compacted, so that the mineralizer inside the bricks is difficult to be lost through the surface of the bricks during the heating process. Thus, the catalytic role of the mineralizer is ensured, and the yield of alpha-alumina is improved.

(6) Compared with the process of producing alpha-alumina by calcining in the traditional kiln such as natural gas rotary kilns and natural gas tunnel kilns, the microwave calcination process of the present disclosure has the advantages of environmental protection and no greenhouse gas emission. According to the statistics, when producing alpha-alumina by calcining in the natural gas rotary kilns, the natural gas consumption is about 100-140 $m^3/t$, and the carbon dioxide emission is about 196-275 kg/t; when producing alpha-alumina by calcining in the natural gas tunnel kilns, the natural gas consumption is about 160-200 $m^3/t$, and the carbon dioxide emission is about 314-392 kg/t. Through the microwave calcination process of the present disclosure, the carbon dioxide emission is reduced by at least 196 kg/t, which is of great significance for China to reach the carbon peak in advance and achieve the carbon neutrality.

(7) Compared with the traditional electric furnace using the saggar to calcine to produce alpha-alumina, the microwave calcination process of the present disclosure has the advantages of low energy consumption and low production cost. The traditional electric furnace adopts indirect heating with low heating rate, which requires to heat the electric furnace up, and then calcine alumina. After the calcination is completed, it requires to lower the temperature of the electric furnace, and then the calcined alumina is taken out, which causes a lot of energy waste and long production cycle. According to the calculation, when using the traditional electric furnace to produce alpha-alumina, the minimum power consumption is about 1600 kWh/ton, while the power consumption of the microwave kiln can be reduced by 30%-40% compared with that of the traditional electric furnace. According to the average price of 0.8 yuan/kWh, the production cost can be reduced by 384-512 yuan/ton. In addition, since the traditional electric furnace requires to use the saggar, and the alumina slag adhering to the inner wall of the saggar after production makes the saggar difficult to reuse, resulting in a large consumption of the saggar during production, with the cost of about 600 yuan/ton. However, the present disclosure prepares the alumina powder into the bricks with the cost of about 200-300 yuan/ton, the cost can be reduced by 300-400 yuan/ton, which has a significant cost-effectiveness.

DETAILED DESCRIPTION OF THE EMBODIMENTS

Figure 1:
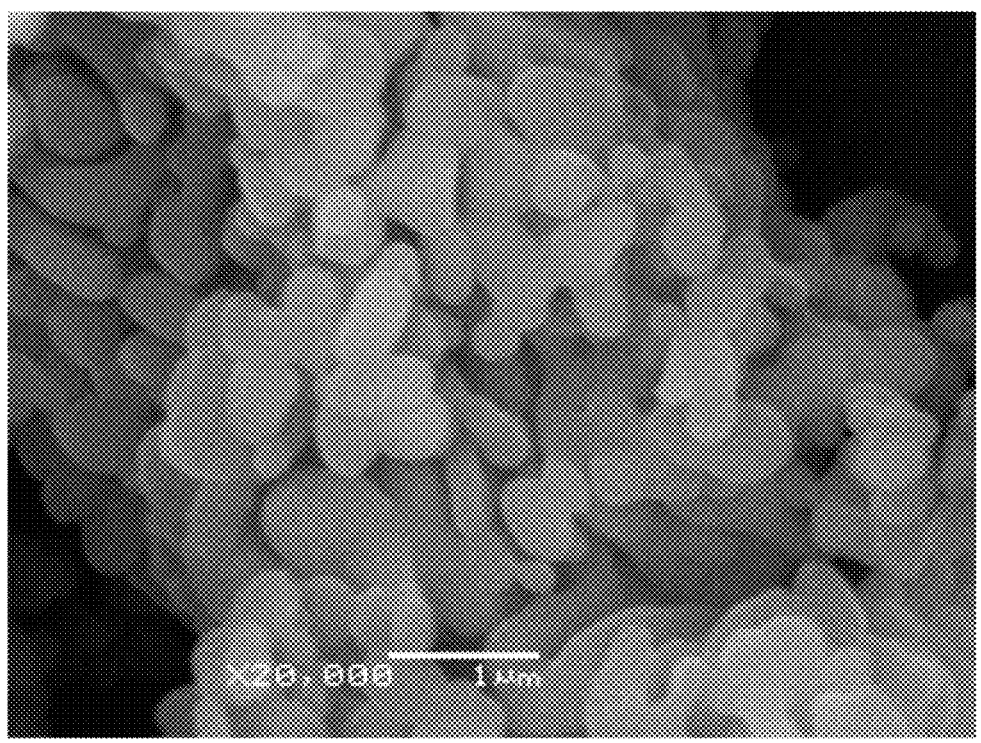
FIG. 1 is an electron microscope photograph of a finished product of microcrystalline alpha-alumina prepared in Example 11 of the present disclosure.

To make the objectives, technical solutions and advantages of the present disclosure understood more clearly, the present disclosure will be described in detail below with reference to the accompanying drawings and examples. It shall be understood that the specific examples described herein are all exemplary, and not intended to limit the present disclosure.

Example 1

(1) The composite mineralizer is added into 100 kg of the alumina raw material to mix evenly to obtain the mixture. The composite mineralizer is 0.1 kg of aluminum chloride, and 0.1 kg of aluminum fluoride, without containing boric acid.

(2) The mixture obtained in the step (1) is put into the ball mill to mill for 3 h, with the ball-to-powder ratio of 6, to obtain the milled alumina powder. The D50 particle size of the milled alumina powder is 4 μm, and the sieve residue ratio of the milled alumina powder sieved with the 200-mesh sieve is 0.07%.

(3) 30 kg of the microwave absorbent is added into the milled alumina powder obtained in the step (2) to stir evenly via the mixer. The microwave absorbent is the aqueous solution of polyvinyl alcohol with the concentration of 1%. Then, the press is used to extrude at 60 MPa, to obtain the alumina green body.

(4) The alumina green body obtained in the step (3) is dried in the oven at 100° C. for 1 h, and the moisture content of the alumina green body dried is 26.7%.

(5) The alumina green body dried in the step (4) is put into the microwave kiln to heating up to 1550° C. at the heating rate of 100° C./h and calcine for 2 h, to obtain the alpha-alumina clinker.

(6) The alpha-alumina clinker obtained in the step (5) is pulverized into small pieces by the crusher, and then milled by the ball mill until the particle size is 1.5 μm, to obtain the finished product of the microcrystalline alpha-alumina.

Example 2

(1) The composite mineralizer is added into 100 kg of the alumina raw material to mix evenly to obtain the mixture. The composite mineralizer is 0.1 kg of calcium chloride, and 0.1 kg of boric acid, without containing the fluoride.

(2) The mixture obtained in the step (1) is put into the ball mill to mill for 3 h, with the ball-to-powder ratio of 5, to obtain the milled alumina powder. The D50 particle size of the milled alumina powder is 7 µm, and the sieve residue ratio of the milled alumina powder sieved with the 200-mesh sieve is 0.34%.

(3) 25 kg of the microwave absorbent is added into the milled alumina powder obtained in the step (2) to stir evenly via the mixer. The microwave absorbent is the aqueous solution of carboxymethyl cellulose with the concentration of 1%. Then, the press is used to extrude at 50 MPa, to obtain the alumina green body.

(4) The alumina green body obtained in the step (3) is dried in the oven at 80° C. for 2 h, and the moisture content of the alumina green body dried is 22.3%.

(5) The alumina green body dried in the step (4) is put into the microwave kiln to heat up to 1500° C. at the heating rate of 100° C./h and calcine for 1 h, to obtain the alpha-alumina clinker.

(6) The alpha-alumina clinker obtained in the step (5) is pulverized into small pieces by the crusher, and then milled by the ball mill until the particle size is 0.1 µm, to obtain the finished product of the microcrystalline alpha-alumina.

Example 3

(1) The composite mineralizer is added into 100 kg of the alumina raw material to mix evenly to obtain the mixture. The composite mineralizer is 0.1 kg of magnesium chloride, 0.01 kg of calcium fluoride, and 0.1 kg of boric acid.

(2) The mixture obtained in the step (1) is put into the ball mill to mill for 3 h, with the ball-to-powder ratio of 4, to obtain the milled alumina powder. The D50 particle size of the milled alumina powder is 11 µm, and the sieve residue ratio of the milled alumina powder sieved with the 200-mesh sieve is 0.77%.

(3) 20 kg of the microwave absorbent is added into the milled alumina powder obtained in the step (2) to stir evenly via the mixer. The microwave absorbent is the aqueous solution of lignin with the concentration of 1%. Then, the press is used to extrude at 40 MPa, to obtain the alumina green body.

(4) The alumina green body obtained in the step (3) is dried in the oven at 50° C. for 2 h, and the moisture content of the alumina green body dried is 17.7%.

(5) The alumina green body dried in the step (4) is put into the microwave kiln to heat up to 1400° C. at the heating rate of 100 and calcine for 0.1 h to obtain the alpha-alumina clinker.

(6) The alpha-alumina clinker obtained in the step (5) is pulverized into small pieces by the crusher, and then milled by the ball mill until the particle size is 0.5 µm, to obtain the finished product of the microcrystalline alpha-alumina.

Example 4

(1) The composite mineralizer is added into 100 kg of the alumina raw material to mix evenly to obtain the mixture. The composite mineralizer is 0.1 kg of ammonium chloride, and 0.01 kg of magnesium chloride, without containing the fluoride and boric acid.

(2) The mixture obtained in the step (1) is put into the ball mill to mill for 3 h, with the ball-to-powder ratio of 3, to obtain the milled alumina powder. The D50 particle size of the milled alumina powder is 17 µm, and the sieve residue ratio of the milled alumina powder sieved with the 200-mesh sieve is 1.46%.

(3) 15 kg of the microwave absorbent is added into the milled alumina powder obtained in the step (2) to stir evenly via the mixer. The microwave absorbent is the aqueous solution of polyvinyl alcohol with the concentration of 0.5%. Then, the press is used to extrude at 20 MPa, to obtain the alumina green body.

(4) The alumina green body obtained in the step (3) is dried in the oven at 25° C. for 2 h, and the moisture content of the alumina green body dried is 13.5%.

(5) The alumina green body dried in the step (4) is put into the microwave kiln to heat up to 1300° C. at the heating rate of 100° C./h and calcine for 1.5 h, to obtain the alpha-alumina clinker.

(6) The alpha-alumina clinker obtained in the step (5) is pulverized into small pieces by the crusher, and then milled by the ball mill until the particle size is 1.0 µm, to obtain the finished product of the microcrystalline alpha-alumina.

Example 5

(1) The composite mineralizer is added into 100 kg of the alumina raw material to mix evenly to obtain the mixture. The composite mineralizer is 0.03 kg of magnesium fluoride, 0.03 kg of calcium fluoride, 0.02 kg of ammonium fluoride, and 0.02 kg of ammonium hydrogen fluoride, without containing the chloride and boric acid.

(2) The mixture obtained in the step (1) is put into the ball mill to mill for 3 h, with the ball-to-powder ratio of 2, to obtain the milled alumina powder. The D50 particle size of the milled alumina powder is 25 µm, and the sieve residue ratio of the milled alumina powder sieved with the 200-mesh sieve is 2.92%.

(3) 10 kg of the microwave absorbent is added into the milled alumina powder obtained in the step (2) to stir evenly via the mixer. The microwave absorbent is the aqueous solution of polyvinyl alcohol with the concentration of 0.01%. Then, the press is used to extrude at 5 MPa, to obtain the alumina green body.

(4) The alumina green body obtained in the step (3) is dried in the oven at 10° C. for 2 h, and the moisture content of the alumina green body dried is 8.5%.

(5) The alumina green body dried in the step (4) is put into the microwave kiln to heat up to 1200° C. at the heating rate of 100° C./h and calcine for 0.5 h, to obtain the alpha-alumina clinker.

(6) The alpha-alumina clinker obtained in the step (5) is pulverized into small pieces by the crusher, and then milled by the ball mill until the particle size is 1.0 µm, to obtain the finished product of the microcrystalline alpha-alumina.

Example 6

(1) The composite mineralizer is added into 100 kg of the alumina raw material to mix evenly to obtain the mixture. The composite mineralizer is 0.5 kg of ammonium chloride, 0.5 kg of ammonium hydrogen fluoride and 0.5 kg of boric acid.

(2) The mixture obtained in the step (1) is put into the ball mill to mill for 3 h, with the hall-to-powder ratio of 1, to obtain the milled alumina powder. The D50 particle size of the milled alumina powder is 33 µm, and the sieve residue ratio of the milled alumina powder sieved with the 200-mesh sieve is 5.11%.

(3) 10 kg of the microwave absorbent is added into the milled alumina powder obtained in the step (2) to stir evenly via the mixer. The microwave absorbent is the mixture of the aqueous solution of polyvinyl alcohol with the concentration of 0.5%, the aqueous solution of carboxymethyl cellulose with the concentration of 0.5%, and the aqueous solution of lignin with the concentration of 0.5% at the mass ratio of 1:1:1. Then, the press is used to extrude at 1 MPa, to obtain the alumina green body.

(4) The alumina green body obtained in the step (3) is dried in the oven at 40° C. for 2 h, and the moisture content of the alumina green body dried is 2.6%.

(5) The alumina green body dried in the step (4) is put into the microwave kiln to heat up to 1100° C. at the heating rate of 100° C./h and calcine for 2.5 h, to obtain the alpha-alumina clinker.

(6) The alpha-alumina clinker obtained in the step (5) is pulverized into small pieces by the crusher, and then milled by the ball mill until the particle size is 1.0 μm, to obtain the finished product of the microcrystalline alpha-alumina.

Example 7

(1) The composite mineralizer is added into 100 kg of the alumina raw material to mix evenly to obtain the mixture. The composite mineralizer is 1 kg of calcium chloride, 1 kg of aluminum fluoride, and 1 kg of boric acid.

(2) The mixture obtained in the step (1) is put into the ball mill to mill for 3 h, with the ball-to-powder ratio of 1.5, to obtain the milled alumina powder. The D50 particle size of the milled alumina powder is 16 μm, and the sieve residue ratio of the milled alumina powder sieved with the 200-mesh sieve is 1.39%.

(3) 15 kg of the microwave absorbent is added into the milled alumina powder obtained in the step (2) to stir evenly via the mixer. The microwave absorbent is the mixture of pseudo-boehmite and water at the mass ratio of 1:100. Then, the press is used to extrude at 0.5 MPa, to obtain the alumina green body.

(4) The alumina green body obtained in the step (3) is dried in the oven at 40° C. for 2 h, and the moisture content of the alumina green body dried is 12.1%.

(5) The alumina green body dried in the step (4) is put into the microwave kiln to heat up to 1050° C. at the heating rate of 100° C./h and calcine for 3 h, to obtain the alpha-alumina clinker.

(6) The alpha-alumina clinker obtained in the step (5) is pulverized into small pieces by the crusher, and then milled by the ball mill until the particle size is 1.0 μm, to obtain the finished product of the microcrystalline alpha-alumina.

Example 8

(1) The composite mineralizer is added into 100 kg of the alumina raw material to mix evenly to obtain the mixture. The composite mineralizer is 2 kg of aluminum chloride, 2 kg of aluminum fluoride, and 1 kg of boric acid.

(2) The mixture obtained in the step (1) is put into the ball mill to mill for 3 h, with the ball-to-powder ratio of 1.5, to obtain the milled alumina powder. The D50 particle size of the milled alumina powder is 21 μm, and the sieve residue ratio of the milled alumina powder sieved with the 200-mesh sieve is 1.93%.

(3) 25 kg of the microwave absorbent is added into the milled alumina powder obtained in the step (2) to stir evenly via the mixer. The microwave absorbent is the mixture of gamma-alumina and water at the mass ratio of 1:50. Then, the press is used to extrude at 4 MPa, to obtain the alumina green body.

(4) The alumina green body obtained in the step (3) is dried in the oven at 30° C. for 2 h, and the moisture content of the alumina green body dried is 17.1%.

(5) The alumina green body dried in the step (4) is put into the microwave kiln to heat up to 1250° C. at the heating rate of 100° C./h and calcine for 3.5 h, to obtain the alpha-alumina clinker.

(6) The alpha-alumina clinker obtained in the step (5) is pulverized into small pieces by the crusher, and then milled by the ball mill until the particle size is 1.0 μm, to obtain the finished product of the microcrystalline alpha-alumina.

Example 9

(1) The composite mineralizer is added into 100 kg of the alumina raw material to mix evenly to obtain the mixture. The composite mineralizer is 3 kg of aluminum chloride, 3 kg of aluminum fluoride, and 1 kg of boric acid.

(2) The mixture obtained in the step (1) is put into the ball mill to mill for 3 h, with the hall-to-powder ratio of 1.5, to obtain the milled alumina powder. The D50 particle size of the milled alumina powder is 25 μm, and the sieve residue ratio of the milled alumina powder sieved with the 200-mesh sieve is 2.83%.

(3) 25 kg of the microwave absorbent is added into the milled alumina powder obtained in the step (2) to stir evenly via the mixer. The microwave absorbent is the mixture of rho-alumina and water at the mass ratio of 1:50. Then, the press is used to extrude at 2 MPa, to obtain the alumina green body.

(4) The alumina green body obtained in the step (3) is dried in the oven at 30° C. for 2 h, and the moisture content of the alumina green body dried is 10.8%.

(5) The alumina green body dried in the step (4) is put into the microwave kiln to heat up to 1250° C. at the heating rate of 100° C./h and calcine for 4 h, to obtain the alpha-alumina clinker.

(6) The alpha-alumina clinker obtained in the step (5) is pulverized into small pieces by the crusher, and then milled by the ball mill until the particle size is 1.0 μm, to obtain the finished product of the microcrystalline alpha-alumina.

Example 10

(1) The composite mineralizer is added into 100 kg of the alumina raw material to mix evenly to obtain the mixture. The composite mineralizer is 2 kg of aluminum fluoride, without containing the chloride and boric acid.

(2) The mixture obtained in the step (1) is put into the ball mill to mill for 3 h, with the ball-to-powder ratio of 1.5, to obtain the milled alumina powder. The D50 particle size of the milled alumina powder is 27 μm, and the sieve residue ratio of the milled alumina powder sieved with the 200-mesh sieve is 3.79%.

(3) 10 kg of the microwave absorbent is added into the milled alumina powder obtained in the step (2) to stir evenly via the mixer. The microwave absorbent is the mixture of aluminum hydroxide and water at the mass ratio of 1:20. Then, the press is used to extrude at 2 MPa, to obtain the alumina green body.

(4) The alumina green body obtained in the step (3) is dried in the oven at 20° C. for 2 h, and the moisture content of the alumina green body dried is 7.6%.

(5) The alumina green body dried in the step (4) is put into the microwave kiln to heat up to 1250° C. at the heating rate of 100° C./h and calcine for 1 h, to obtain the alpha-alumina clinker.

(6) The alpha-alumina clinker obtained in the step (5) is pulverized into small pieces by the crusher, and then milled by the ball mill until the particle size is 1.0 μm, to obtain the finished product of the microcrystalline alpha-alumina.

Example 11

(1) The composite mineralizer is added into 10000 kg of the alumina raw material to mix evenly to obtain the mixture. The composite mineralizer is 1 kg of aluminum chloride, 1 kg of aluminum fluoride, and 1 kg of boric acid.

(2) The mixture obtained in the step (1) is put into the ball mill to mill for 3 h, with the ball-to-powder ratio of 1.5, to obtain the milled alumina powder. The D50 particle size of the milled alumina powder is 15 μm, and the sieve residue ratio of the milled alumina powder sieved with the 200-mesh sieve is 0.07%.

(3) 2500 kg of the microwave absorbent is added into the milled alumina powder obtained in the step (2) to stir evenly via the mixer. The microwave absorbent is the mixture of aluminum hydroxide and water at the mass ratio of 1:20. Then, the press is used to extrude at 10 MPa, to obtain the alumina green body.

(4) The alumina green body obtained in the step (3) is dried in the oven at 80° C. for 6 h, and the moisture content of the alumina green body dried is 11%.

(5) The alumina green body dried in the step (4) is put into the microwave kiln to heat up to 1250° C. at the heating rate of 100° C./h and calcine for 1 h, to obtain the alpha-alumina clinker.

(6) The alpha-alumina clinker obtained in the step (5) is pulverized into small pieces by the crusher, and then milled by the ball mill until the particle size is 0.8 μm, to obtain the finished product of the microcrystalline alpha-alumina.

The value of the independent electric meter of the microwave kiln is recorded before and after calcination, and the difference of the electric meter before and after calcination is 9771 kWh, and the power consumption per unit is 9771 kWh/ton. Compared with the power consumption of the old electric furnace which is 1600 kWh/ton, 39% of the electricity can be saved.

An appropriate amount of the finished product of microcrystalline alpha-alumina obtained in the step (6) is taken to be microscopically inspected via the SEM scanning, electron microscope, and the result is as shown in FIG. 1.

Example 12

(1) The composite mineralizer is added into 10000 kg of the alumina raw material to mix evenly to obtain the mixture. The composite mineralizer is 1 kg of aluminum chloride, 1 kg of aluminum fluoride, and 1 kg of boric acid.

(2) The mixture obtained in the step (1) is put into the ball mill to mill for 3 h, with the ball-to-powder ratio of 1.5, to obtain the milled alumina powder. The D50 particle size of the milled alumina powder is 15 μm, and the sieve residue ratio of the milled alumina powder sieved with the 200-mesh sieve is 0.07%.

(3) 1500 kg of the microwave absorbent is added into the milled alumina powder obtained in the step (2) to stir evenly via the mixer. The microwave absorbent is the aqueous solution of polyvinyl alcohol with the concentration of 1%. Then, the press is used to extrude at 10 MPa, to obtain the alumina green body.

(4) The alumina green body obtained in the step (3) is dried in the oven at 80° C. for 3 h, and the moisture content of the alumina green body dried is 10.1%.

(5) The alumina green body dried in the step (4) is put into the microwave kiln to heat up to 1300° C. at the heating rate of 100° C./h and calcine for 1 h, to obtain the alpha-alumina clinker.

(6) The alpha-alumina clinker obtained in the step (5) is pulverized into small pieces by the crusher, and then milled by the ball mill until the particle size is 1.2 μm, to obtain the finished product of the microcrystalline alpha-alumina.

The value of the independent electric meter of the microwave kiln is recorded before and after calcination, and the difference of the electric meter before and after calcination is 10827 kWh, and the power consumption per unit is 1082.7 kWh/ton. Compared with the power consumption of the old electric furnace which is 1600 kWh/ton, 33% of the electricity can be saved.

Figure 2:
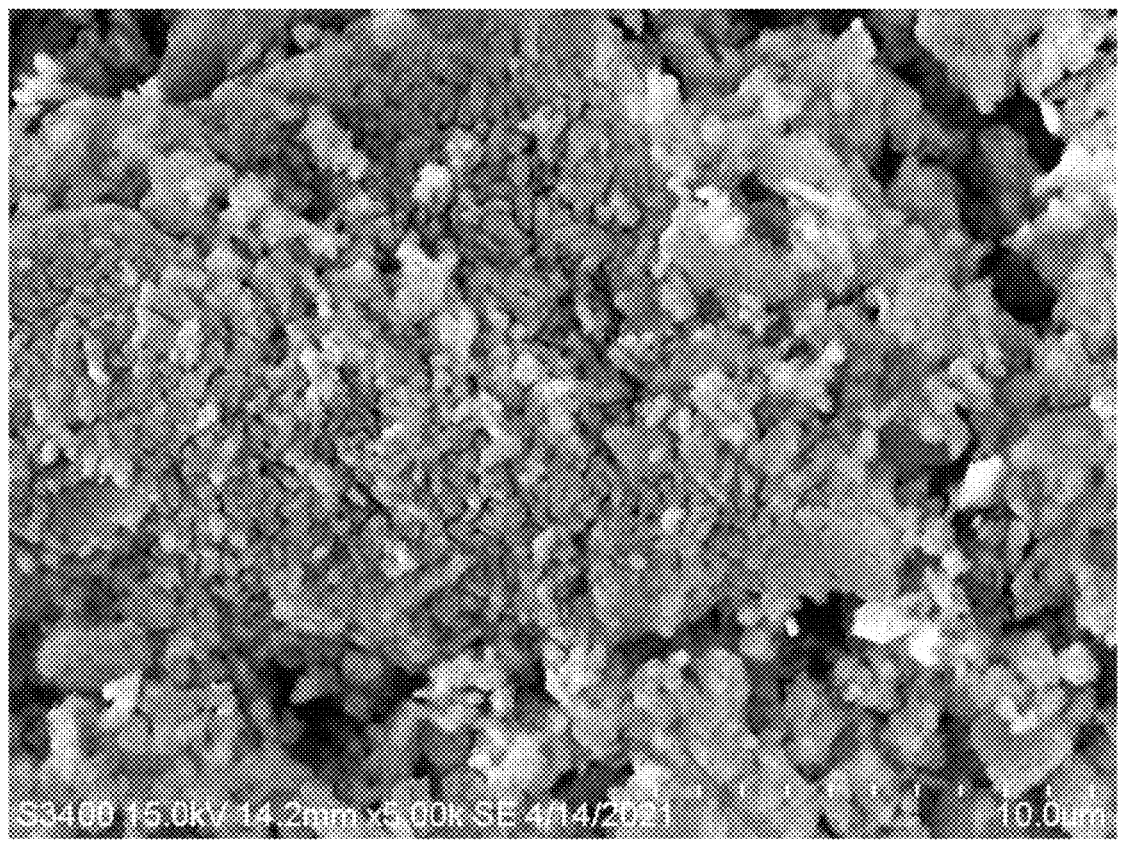
FIG. 2 is an electron microscope photograph of a finished product of microcrystalline alpha-alumina prepared in Example 12 of the present disclosure.

An appropriate amount of the finished product of microcrystalline alpha-alumina obtained in the step (6) is taken to be microscopically inspected via the SEM scanning electron microscope, and the result is as shown in FIG. 2.

The above descriptions are only preferred examples of the present disclosure, and not intended to limit the present disclosure. Any modifications, equivalent replacements and improvements made within the spirit and principle of the present disclosure shall fall within the protection scope of the present disclosure.

What is claimed is:

1. A process for producing microcrystalline alpha-alumina by microwave calcination, wherein, comprising the following steps:
   S1. adding a composite mineralizer to an alumina rave material and nixing uniformly, to obtain a mixture;
   S2. putting the mixture obtained in the step S1 into a ball mill for ball milling, to obtain a milled alumina powder;
   S3. adding a certain proportion of a microwave absorbent into the milled alumina powder obtained in the step S2 and stirring evenly, and then extruding by a press, to obtain an alumina green body;
   S4. drying the alumina green body obtained in the step S3, to adjust a moisture content of the alumina green body;
   S5. feeding the alumina green body dried in the step S4 into a microwave kiln, then heating the microwave kiln to a set temperature, and calcining for a certain period of time, to obtain an alpha-alumina clinker; and
   S6. pulverizing the alpha-alumina clinker obtained in the step S5, to obtain the microcrystalline alpha-alumina.

2. The process for producing the microcrystalline alpha-alumina by the microwave calcination according to claim 1, wherein, based on the weight of the alumina raw material, the composite mineralizer in the step S1 is composed of the following components: chloride 0%-3%, fluoride 0%-3%, and boric acid 0%-1%; and a minimum addition amount of the composite mineralizer is 0.01%.

3. The process for producing the microcrystalline alpha-alumina by the microwave calcination according to claim 2, wherein, in the step S3, the microwave absorbent is composed of a microwave-absorbing component with a mass ratio of 0.01%-1%, and the balance of water; and the microwave-absorbing component is one or more of polyvinyl alcohol, carboxymethyl cellulose, and lignin.

4. The process for producing the microcrystalline alpha-alumina by the microwave calcination according to claim 2, wherein, in the step S3, the microwave absorbent is composed of the microwave-absorbing component with the mass ratio of 1%-5%, and the balance of water; and the microwave-absorbing component is one or more of pseudo-boehmite, gamma-alumina, rho-alumina, and aluminum hydroxide.

5. The process for producing the microcrystalline alpha-alumina by the microwave calcination according to claim 2, wherein, the fluoride is any one or more of aluminum fluoride, calcium fluoride, magnesium fluoride, ammonium fluoride, and ammonium hydrogen fluoride; the chloride is any one or more of aluminum chloride, calcium chloride, magnesium chloride, and ammonium chloride.

6. The process for producing the microcrystalline alpha-alumina by the microwave calcination according to claim 1, wherein, in the step S2, a hall-to-powder ratio of the ball mill is 1-6, a D50 particle size of the milled alumina powder is 5-30 μm, and a sieve residue ratio of the milled alumina powder sieved with a 200-mesh sieve is less than or equal to 5%.

7. The process for producing the microcrystalline alpha-alumina by the microwave calcination according to claim 1, wherein, in the step S3, a mass ratio of the microwave absorbent and the milled alumina powder is 0-0.3, and a molding pressure of the alumina green body is 0.5 MPa-60 MPa.

8. The process for producing the microcrystalline alpha-alumina by the microwave calcination according to claim 1, wherein, in the step S4, the drying temperature is 10° C.-100° C., and the moisture content of the alumina green body dried is 3%-20%.

9. The process for producing the microcrystalline alpha-alumina by the microwave calcination according, to claim 1, wherein, in the step S5, the set temperature is 1100° C.-1500° C., and the calcination time is 0.1-4 h.

10. The process for producing the microcrystalline alpha-alumina by the microwave calcination according to claim 1, wherein, in the step (6), a particle size of the microcrystalline alpha-alumina obtained in the step S6 is 0.1-1.5 μm.

* * * * *